United States Patent Office 3,317,585
Patented May 2, 1967

3,317,585
PREPARATION OF NITRILES
Charles Herschmann, Geneva, Switzerland, assignor to
Lonza Ltd., Gampel, Switzerland
No Drawing. Filed Aug. 15, 1963, Ser. No. 302,452
Claims priority, application Switzerland, Aug. 16, 1962,
9,887/62
2 Claims. (Cl. 260—465.2)

The invention relates to the preparation of nitriles from amides.

Nitriles have been prepared by reacting amides with phosphorus oxychloride, phosphorus pentoxide, or phosphorus pentachloride in various solvents such as aliphatic or aromatic, also chlorinated hydrocarbons. All these methods have the drawback of rather long reaction times and poor yields and produce products which are difficult or even impossible to purify.

It is also known to use pyridine in a large stoichiometric excess as reaction medium for the preparation of nitriles from the respective amides and phosphorus oxychloride; also here, the recovery of the formed nitrile is difficult, and the method is uneconomic due to the low yields and the high cost of the solvent.

Finally, it is known to use for the dehydration of amides to nitriles in the absence of solvents anhydrous aluminum chloride, preferably in the form of its double salt with NaCl, in a stoichiometric excess of 10 to 50 percent.

All these methods produce nitriles which are not sufficiently stable and which are subject to fast discoloration. These drawbacks are particularly obnoxious in the preparation of malodinitrile and monochloro acetonitrile.

I have found that said drawbacks are avoided and that nitriles of high purity are obtained in good yields when catalytic amounts of organic nitrogen bases are added to the reaction of an amide with a dehydrating agent of the phosphorus group in an inert solvent. If the catalytic amounts of such bases are employed together with catalytic amounts of metal halides of Lewis acids, nitriles of exceptional stability and increased purity are produced in excellent yields.

The method of the invention can be applied for the preparation of all nitriles, such as acetonitrile and its chlorinated derivatives, malodinitrile, phthalodinitrile, and others, using the corresponding amides as starting materials. The invention is of particular advantage for the preparation of nitriles from such amides which have the tendency to agglomerate under the action of the dehydrating agent; therefore, the method is particularly suitable for the preparation of the dinitrile of malonic acid and of monochloro acetonitrile.

As organic nitrogen bases, I may use the free bases and their acyl derivatives, and their hydrohalide salts, particularly their hydrochlorides.

The organic nitrogen bases can be primary, secondary, or tertiary, aliphatic, aromatic or heterocyclic amines. Examples are pyridine, dimethyl formamide, dimethylamine hydrochloride, N,N-dimethylaniline, ethylamine hydrochloride, ethylamine, diethylamine, and others. The molar concentration must not exceed 10% and is preferably 0.1 to 5% of the amide.

Suitable metal halides of Lewis acids are, for instance, metal chlorides, ferric chloride, gallium trichloride, germanium tetrachloride, or hydrogen halide addition compounds thereof; preferably, aluminum trichloride or titanium tetrachloride are employed.

For efficient operation of the thus formed catalytic system, it is necessary to maintain certain ratios between said two catalytic components and the reacting amide. The total molar concentration of the catalytic system should not exceed 10 percent, whereby the concentration of either component should be preferably about 0.1 to 5 percent of the molar concentration of the amide and the molar concentration of the base is preferably higher than that of the Lewis acid. Dehydrating agents of the phosphorus group are, for instance, phosphorus pentachloride, phosphorus pentoxide, and preferably phosphorus oxychloride. They are employed in a slight excess, preferably 5 to 20%, over the theoretical amount. Suitable inert reaction media are liquid hydrocarbons and chlorinated hydrocarbons such as 1,2-dichloroethane, 1,2,2-tri-chloroethane, carbon tetrachloride, benzene, monochlorobenzene, hexane, cyclohexane, and the like, which are preferably used in an amount of 25 to 250 cc. per 1 mole of amide.

In order to obtain a nitrile which is free from the smell of phosphorus oxychloride, it is of advantage to add to the reaction mixture an alkali metal or alkaline earth metal halide in a stoichiometric excess, preferably 5 to 30 percent calculated on the metaphosphoric acid formed in the reaction. Such halides do not belong to the group of Lewis acids and are added preferably at the beginning of the reaction, at the latest prior to the recovery of the formed nitrile.

Depending on the amide solvent employed, the reaction temperature may vary between 50 and 150° C. Preferably, the temperature is maintained below 100° C., and the solvent is refluxed.

The reaction may be carried out at normal pressures or also at reduced pressures down to 20 mm. Hg.

The method of the invention offers the advantage that large amounts of reaction components may be employed and that they may be present in their totality from the start of the reaction. Of course, the reactants may also be added gradually, which, however, prolongs the reaction time.

The following examples are given to illustrate the invention.

*Example 1*

A Keller three-neck sulfonation flask of 2.5 liter capacity was equipped with an efficient stirrer and a reflux cooler with large surface and it was connected with an absorption system for hydrogen chloride. In said flask, there were introduced 420 g. of cyanacetamide (5 moles), 175 g. of NaCl (3 moles), 1200 cc. of dry dichloroethane, 422 g. of phosphorus oxychloride (2.75 moles), and 4 g. of pyridine (0.05 mole). Then stirring and heating (with a heating jacket of 450 watt) was started whereby the temperature reached 84° C. within 50 minutes, dropped during the next 30 minutes by 10° C.—the temperature drop is due to the evolution of HCl—rose in further 150 minutes again to 88° C., where it was maintained for 30 minutes. The development of HCl had then substantially stopped.

Subsequently, the solution was cooled with stirring. A clear yellow solution was obtained which contained in suspension a granular orange precipitate consisting essentially of sodium metaphosphate. The precipitate was filtered and washed three times with 250 cc. of dry dichloroethane. The liquid phases were combined and concentrated, and the malodinitrile was distilled off in a vacuum of 0.01 mm. Hg. There were obtained 269.8 g. of a colorless substance having a melting point of 31.5 to 32° C. The yield was 84.4%, calculated on the amide. The product remained colorless still 48 hours after the distillation.

*Example 2*

336 g. of cyanacetamide (4 moles), 135 g. of NaCl (2.3 moles), 1000 cc. of dry dichloroethane, 370 g. of $POCl_3$ (2.4 moles), 11 g. of diethylamine hydrochloride (0.1 mole), and 8 g. of $AlCl_3$ (0.06 mole) were introduced into the apparatus of Example 1. The mixture was refluxed and all the solid products were kept suspended by stirring. The temperature reached 85.5° C. after 40 minutes, decreased in the next 30 minutes to 71.3° C., and then rose steadily until it had reached in the 175th minute 88.7° C., whereupon the mixture was heated for further 20 minutes. The reaction was completed after 3 hours and 15 minutes, as indicated by the ceasing HCl development. The reaction mass consisted of a citron yellow solution, containing a clear yellow powdery and easily filtering suspension essentially of sodium metaphosphate. After cooling, filtering, and washing of the precipitate, the malodinitrile was recovered by distillation in vacuo; 253.6 g. (yield=96%) of a completely colorless and odorless stable product ($m$=32.1° C.). After 6 months, no change, even in the molten state, could be observed though the product had been stored without exclusion of air, light and moisture.

*Example 3*

187 g. of monochloroacetamide (2 moles), 65 g. of NaCl (1.11 moles), 500 cc. of dry carbon tetrachloride, 5.5 g. of diethylamine hydrochloride (0.05 mole), 4 g. of $AlCl_3$ (0.03 mole), and 169 g. of $POCl_3$ (1.1 moles) were introduced into the apparatus of Example 1. The mixture was refluxed until the gas development had ceased which took about 3 hours. After filtering and washing the precipitate, the solution was concentrated by means of a fractionating column; 140.7 g. (yield=93%) of monochloroacetonitrile ($b$=47° C./10 mm. Hg) were collected after elimination of the solvent. The product was colorless and odorless (especially free of the smell of phosphorus oxychloride), and was stable in storage.

*Example 4*

485 g. of benzamide (4 moles), 135 g. of NaCl (2.5 moles), 900 cc. of dry dichloroethane, 15.76 g. of N,N-dimethylaniline hydrochloride (0.1 mole), 370 g. of $POCl_3$ (2.4 moles), and 8 g. of $AlCl_3$ (0.06 mole) were introduced in a three-necked Keller sulfonation flask of 2.5 liter capacity, heated with a heating jacket of 450 watt, the flask being equipped as in Example 1. Stirring and heating were started: The temperature reached 83.4° C. after 35 minutes, dropped to 72.2° C. in the next 35 minutes and rose to 86.4° C. at the 165th minute, where it was maintained still 15 minutes, time after which the evolution of HCl had practically ceased. The stirred solution was cooled, the precipitate filtrated and washed with 3 portions of 200 cc. of dry dichloroethane. The combined liquid phases were concentrated and 390 g. of pure benzonitrile distilled at 67.5° C./9 mm. Hg. The yield is 95.5%.

I claim:
1. A process for the preparation of malodinitrile comprising heating cyanoacetamide dissolved in an inert organic solvent at a temperature of 50 to 100° C. with a dehydrating agent selected from the group consisting of phosphorus pentoxide, phosphorus pentachloride, and phosphorus oxychloride in the presence of catalytic amounts of an organic nitrogen base and a member of the group consisting of $AlCl_3$ and $AlCl_3 \cdot NaCl$, the sum of the molar concentrations of said catalytic amounts not exceeding 10 mole percent of said cyanoacetamide.

2. A process for the preparation of monochloroacetonitrile comprising heating monochloroacetamide dissolved in an inert organic solvent at a temperature of 50 to 100° C. with a dehydrating agent selected from the group consisting of phosphorus pentoxide, phosphorus pentachloride, and phosphorus oxychloride in the presence of catalytic amounts of an organic nitrogen base and a member of the group consisting of $AlCl_3$ and $AlCl_3 \cdot NaCl$, the sum of the molar concentrations of said catalytic amounts not exceeding 10 mole percent of said monochloroacetamide.

References Cited by the Examiner
UNITED STATES PATENTS
2,387,435  10/1945  Fleysher _____ 260—465

OTHER REFERENCES

Degering: An Outline of Organic Nitrogen Compounds, 1945, p. 504.

Norris et al.: Journal of American Chemical Society, 1940, vol. 62, pp. 1432–1435.

CHARLES B. PARKER, *Primary Examiner.*

JOSEPH P. BRUST, *Examiner.*

DALE R. MAHANAND, *Assistant Examiner.*